(12) United States Patent
Oh et al.

(10) Patent No.: US 8,046,869 B2
(45) Date of Patent: *Nov. 1, 2011

(54) MOTOR-NOISE ABSORBING APPARATUS OF VACUUM CLEANER

(75) Inventors: Hyun-jun Oh, Gwangju (KR);
Seung-gee Hong, Gyeonggi-do (KR);
Myung-won Lee, Gwangju (KR);
Hwan-seok Yang, Gwangju (KR);
Sang-won Lee, Gwangju (KR)

(73) Assignee: Samsung Electronics Co., Ltd., Gwangju-si (KR)

( * ) Notice: Subject to any disclaimer, the term of this patent is extended or adjusted under 35 U.S.C. 154(b) by 1247 days.

This patent is subject to a terminal disclaimer.

(21) Appl. No.: 11/732,058

(22) Filed: Apr. 2, 2007

(65) Prior Publication Data
US 2008/0098561 A1    May 1, 2008

(30) Foreign Application Priority Data
Oct. 31, 2006   (KR) .................. 10-2006-0106163

(51) Int. Cl.
*A47L 9/00* (2006.01)
(52) U.S. Cl. ........................................... 15/326
(58) Field of Classification Search .............. 15/326
See application file for complete search history.

(56) References Cited

U.S. PATENT DOCUMENTS

| | | | | |
|---|---|---|---|---|
| 4,733,429 A | * | 3/1988 | Jacob et al. | 15/327.1 |
| 5,640,740 A | * | 6/1997 | Martin et al. | 15/327.1 |
| 5,720,074 A | * | 2/1998 | Lee | 15/326 |
| 6,336,244 B1 | * | 1/2002 | Tarutani et al. | 15/412 |
| 6,611,989 B2 | * | 9/2003 | Oh et al. | 15/323 |
| 6,666,660 B2 | * | 12/2003 | Kegg et al. | 417/368 |
| 6,870,292 B2 | * | 3/2005 | Owada et al. | 310/194 |
| 2005/0132528 A1 | * | 6/2005 | Yau | 15/344 |
| 2006/0117518 A1 | * | 6/2006 | Hwang | 15/326 |
| 2006/0213022 A1 | | 9/2006 | Oh | |
| 2006/0260091 A1 | * | 11/2006 | Song et al. | 15/326 |
| 2007/0136982 A1 | * | 6/2007 | Lee et al. | 15/326 |

FOREIGN PATENT DOCUMENTS

| | | |
|---|---|---|
| DE | 19802345 | 5/1999 |
| EP | 0888742 | 1/1999 |
| EP | 1785080 | 5/2007 |
| KR | 1020040026908 | 4/2004 |
| KR | 1020040031934 | 4/2004 |

OTHER PUBLICATIONS

Extended European Search Report dated Feb. 19, 2008 corresponding to European Patent Application No. 07011752.8-2316.

* cited by examiner

*Primary Examiner* — Randall Chin
(74) *Attorney, Agent, or Firm* — Ohlandt, Greeley, Ruggiero & Perle, LLP

(57) ABSTRACT

A motor-noise absorbing apparatus of a vacuum cleaner is disclosed. The motor-noise absorbing apparatus includes a body seated and fixed on a peripheral part of an opening of a motor housing to close between the motor housing and a stator core and, thus, to restrict an amount of the air discharged between the motor housing and the stator core, a first air discharging part formed in the middle of the body, so that most of the air comes out of the guide vein is discharged between the stator core and a rotor, and at least one second air discharging part formed to penetrate a peripheral part of the body, so that a portion of the air coming out of the guide vein is discharged between the motor housing and the stator core.

13 Claims, 7 Drawing Sheets

MOTOR-NOISE ABSORBING APPARATUS OF VACUUM CLEANER

CROSS-REFERENCE TO RELATED APPLICATIONS

This application claims the benefit under 35 U.S.C. §119(a) of Korean Patent Application No. 2006-0106163, filed on Oct. 31, 2006, in the Korean Intellectual Property Office, the disclosure of which is incorporated herein by reference in its entirety.

BACKGROUND OF THE INVENTION

1. Field of the Invention

The present disclosure relates to a motor of a vacuum cleaner, and more particularly, to a motor-noise absorbing apparatus of a vacuum cleaner capable of absorbing and reducing flow noise generating by air, which is discharged in a high speed from an impeller, in a discharge section from a guide vein to windows of a motor housing.

2. Description of the Related Art

Generally, a vacuum cleaner takes in air laden with foreign substance, such as dust or the like, and separates the foreign substance from the air. Such vacuum cleaners include a cleaner motor mounted therein to generate a suction force. Such a conventional cleaner motor is explained as follows with reference to FIG. 1.

As illustrated in FIG. 1, the conventional cleaner motor is provided with a cup-shaped motor housing 10. A front bearing 19a, which is fixed by a front cover 21, is installed on an opened front end of the motor housing 10. A rear bearing 19b is installed on the middle of a closed rear end of the motor housing 10. In addition, to supply electric power, a plurality of brushes 13 is symmetrically joined to both sides of the motor housing 10, and to discharge air taken into the motor housing 10, a plurality of windows are formed in a circumferential direction of the motor housing 10.

Also, a core 11 on which a coil 12 is wound is forcibly inserted into a bracket 14 and supported and fixed by the bracket 14 in the motor housing 10. A rotor 17 is inserted into and rotatably coupled to the stator core 11. In this case, a motor axis 18 is forcibly inserted into and fixed to a rotor 17 to move in combination therewith, and a commutator 15 with which the brushes 13 is fixed to come in close contact is forcibly inserted into and fixed to a rear side of the rotor 17. The motor axis 18 at both ends thereof is supported and fixed by the front and the rear bearing 19a and 19b. In addition, an impeller 23 is connected with one end of the motor axis 18 to move in combination with the motor axis 18 and thus to generate a suction force. A diffuser 25 is disposed in the vicinity of an outer circumferential surface of the impeller 23, and a guide vein 27 is integrally formed with a rear side of the diffuser 25. An impeller cover 29, which is joined with the opened front end of the motor housing 10 to accommodate the impeller 23, the diffuser 25 and the guide vein 27, is provided with an air inlet 29a at the middle thereof and forms an air discharging passage to discharge air taken in by a rotation of the impeller 23.

An operation of the cleaner motor constructed as described above is as follows. The rotor 17 is rotated by electrical interaction between a stator 11, 12 and the rotor 17 caused by applied electrical power. A rotating force of the rotor 17 is transmitted to the impeller 23 through the motor axis 18 supporting the rotor 17. After air is taken into the impeller cover 29 through the air inlet 29a thereof by the rotating force of the impeller 23, it is forced out in a high speed from the impeller 23 by an impeller vein formed in the impeller 23, which rotates in a high speed, and then flows into the guide vein 27 along a bent air passage formed by the impeller cover 29 via the diffuser 25 fixed in the vicinity of a peripheral part of the impeller 23. The air forced into the guide vein 27 flows out through a space S1 between the stator core 11 and the rotor 17 in the motor housing 10 and a space S2 between the motor housing 10 and the stator core 11. At this time, the air cools the stator core 11 and the rotor 17. The air is discharged outside the motor housing 10 through the plurality of windows of the motor housing 10 to produce a suction force required for the vacuum cleaner.

However, according to the cleaner motor as described above, a problem occurs, in that noise is generated as the air, the positive pressure of which is increased while passing through the impeller 23 and the diffuser 25 in turn by rotation movement of the impeller 23, flows out in a high speed through the spaces S1 and S2. Particularly, since the brushes 13 and the bracket 14 supporting the stator core 11 are complicatedly formed in the space S2, the air generates collision noise while colliding with the complicated structures as described above.

To address the problem, in Korean patent No. 474344 is disclosed a motor-noise absorbing apparatus in which a noise absorbing member formed of a metal net having certain meshes is inserted between a rear side of a housing cover and a front side of a protector to disturb the flow of air, which is discharged in a high speed toward a plurality of windows through the inside of a motor housing and, thus, to absorb and reduce flow noise.

However, since such a conventional motor-noise absorbing apparatus is made up of the metal net as described above, there is a limit to how far collision noise may be absorbed and reduced. This is because as described above, the collision noise is generated as most of the air moving toward the windows from the guide vein 27 passes through the space S2 between the motor housing 10 and the stator core 11 and thus collides with the complicated structures, such as the brushes 13 and the bracket 14. Thus, an amount of the collision noise, which can be absorbed and reduced by the conventional motor-noise absorbing apparatus, is restricted.

SUMMARY OF THE INVENTION

The present disclosure has been developed in order to solve the above problems in the related art. Accordingly, an aspect of the present disclosure is to provide a motor-noise absorbing apparatus of a vacuum cleaner capable of absorbing and reducing flow noise in a motor housing caused by air passing between the motor housing and a stator core.

The above aspect is achieved by providing a motor-noise absorbing apparatus of a vacuum cleaner for absorbing noise generated in a motor housing by discharge air when air, taken in through a top of a motor cover, is discharged out of a guide vein integrally formed with the motor cover below a bottom surface of an impeller via an impeller vein of the impeller, and then discharged to a plurality of windows of the motor housing through between the motor housing and a stator core and between the stator core and a rotor. The motor-noise absorbing apparatus includes a body seated and fixed on a peripheral part of an opening of the motor housing to close between the motor housing and the stator core and thus to restrict an amount of the air discharged between the motor housing and the stator core, a first air discharging part formed in the middle of the body, so that most of the air discharged out of the guide vein is discharged between the stator core and the rotor, and at least one second air discharging part formed to penetrate a peripheral part of the body, so that a portion of the air discharged out of the guide vein is discharged between the motor housing and the stator core.

Preferably, but not necessarily, the second air discharging part is formed in an area smaller than that of the first air discharging part, so that the amount of the air discharged between the motor housing and the stator core is less than that of the air discharged between the stator core and the rotor.

The second air discharging part may be formed of at least one grill-shaped part, or at least one porous part in which a plurality of small holes is formed. Also, the second air discharging part may be formed of at least two or four elongated holes disposed symmetrical to each other about the first air discharging part.

The body may be configured, so that an upper surface thereof is increasingly rounded in an inward-and-down direction toward a center from a peripheral side, thereby smoothly discharging most of the air from the guide vein.

BRIEF DESCRIPTION OF THE DRAWING FIGURES

The above aspects and other advantages of the present disclosure will be more apparent by describing exemplary embodiments of the present disclosure with reference to the accompanying drawing figures, in which.

Figure 6:
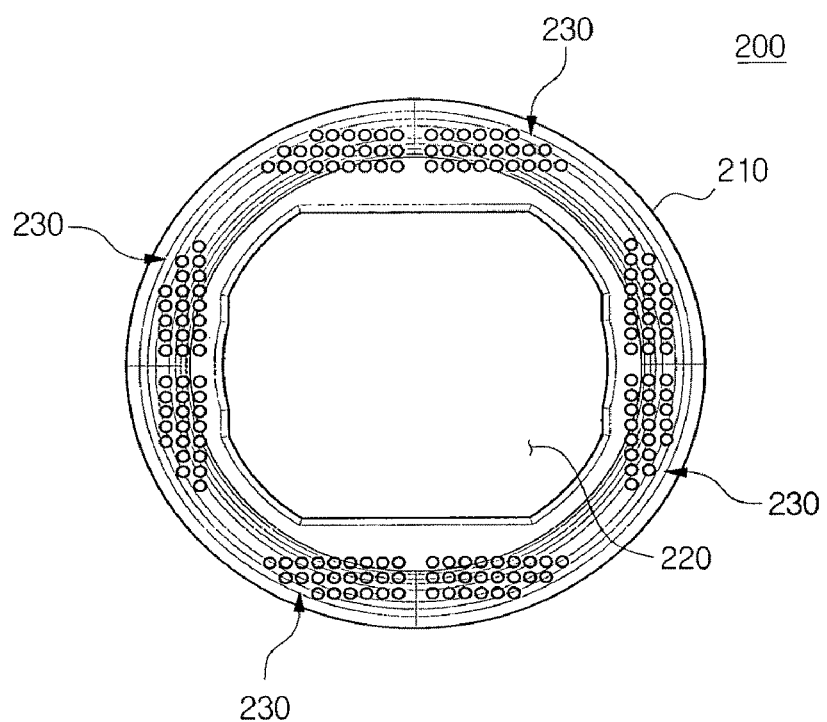
Figure 7:
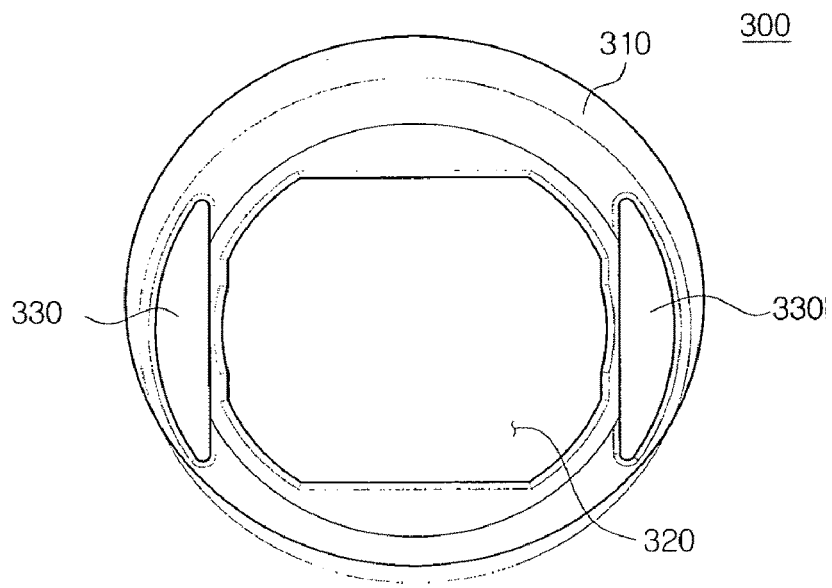
Figure 8:
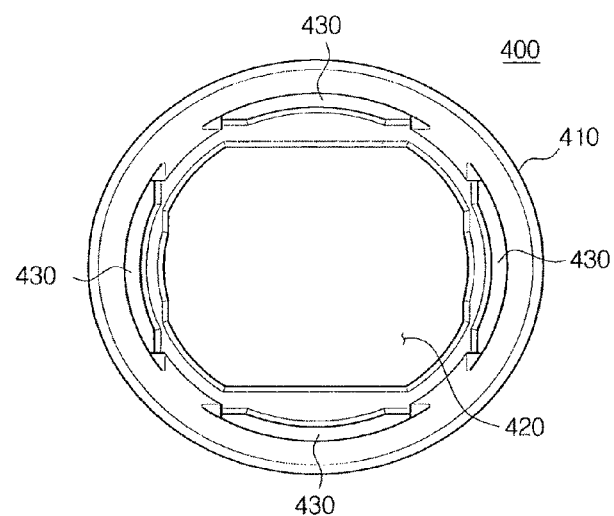
Figure 9:
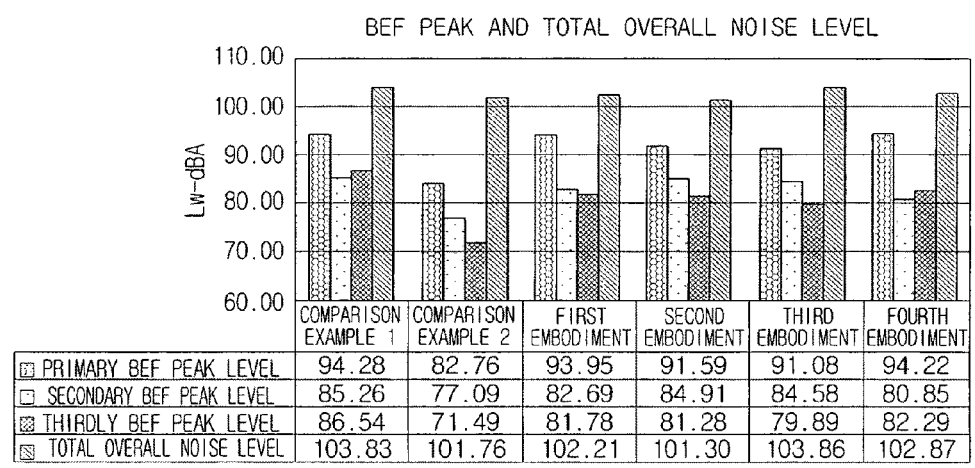

FIGS. 6 through 8 are top plan views exemplifying motor-noise absorbing apparatuses of a vacuum cleaner according to second through fourth exemplary embodiments of the present disclosure, respectively; and FIG. 9 is a graph exemplifying results, which compares motor noises measured when the motor-noise absorbing apparatuses of the first through fourth exemplary embodiments of the present disclosure are installed, respectively, with those when not installed.

In the drawing figures, it should be understood that like reference numerals refer to like features and structures.

DETAILED DESCRIPTION OF AN EXEMPLARY EMBODIMENT

Hereinafter, a motor-noise absorbing apparatus of a vacuum cleaner according to a first exemplary embodiments of the present disclosure will now be described in greater detail with reference to the accompanying drawing figures.

Figure 2:
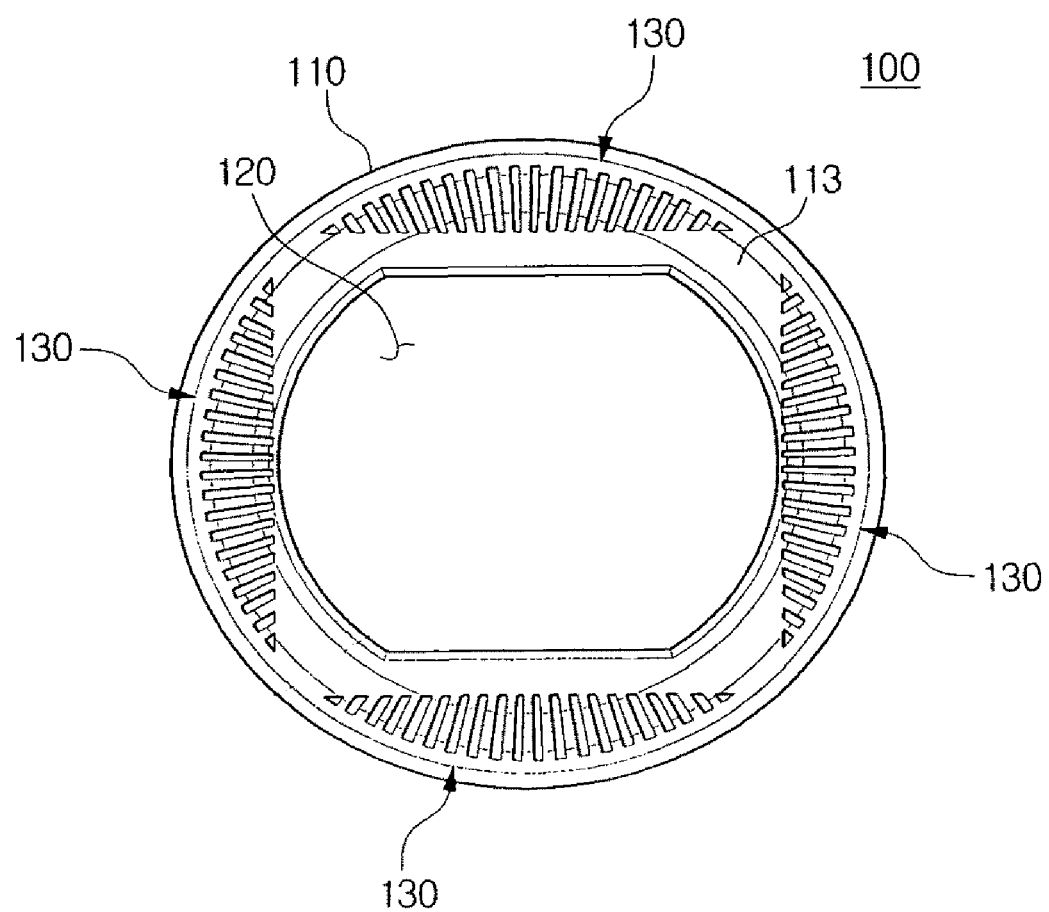
FIG. 2 is a top plan view exemplifying a motor-noise absorbing apparatus of a vacuum cleaner according to a first exemplary embodiment of the present disclosure.
Figure 3:
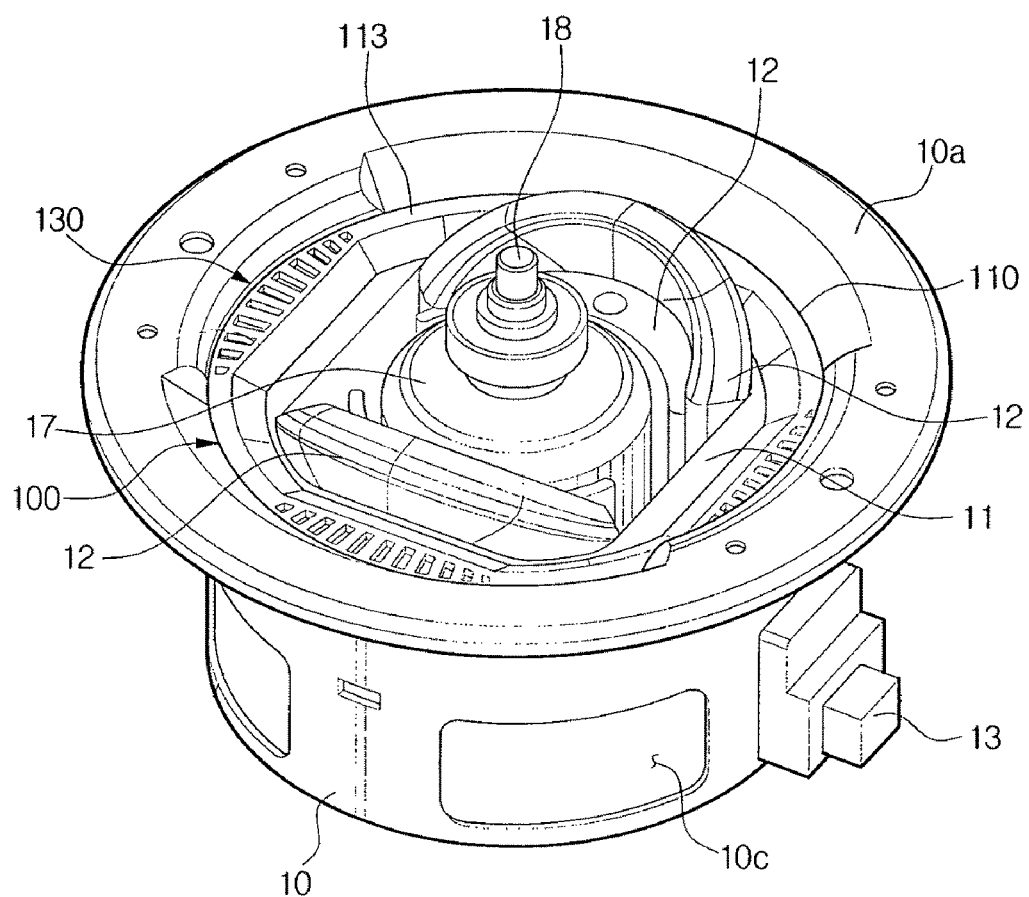
FIG. 3 is a perspective view exemplifying the motor-noise absorbing apparatus according to the first exemplary embodiment of the present disclosure illustrated in FIG. 2 when it is installed in a motor housing.
Figure 4:
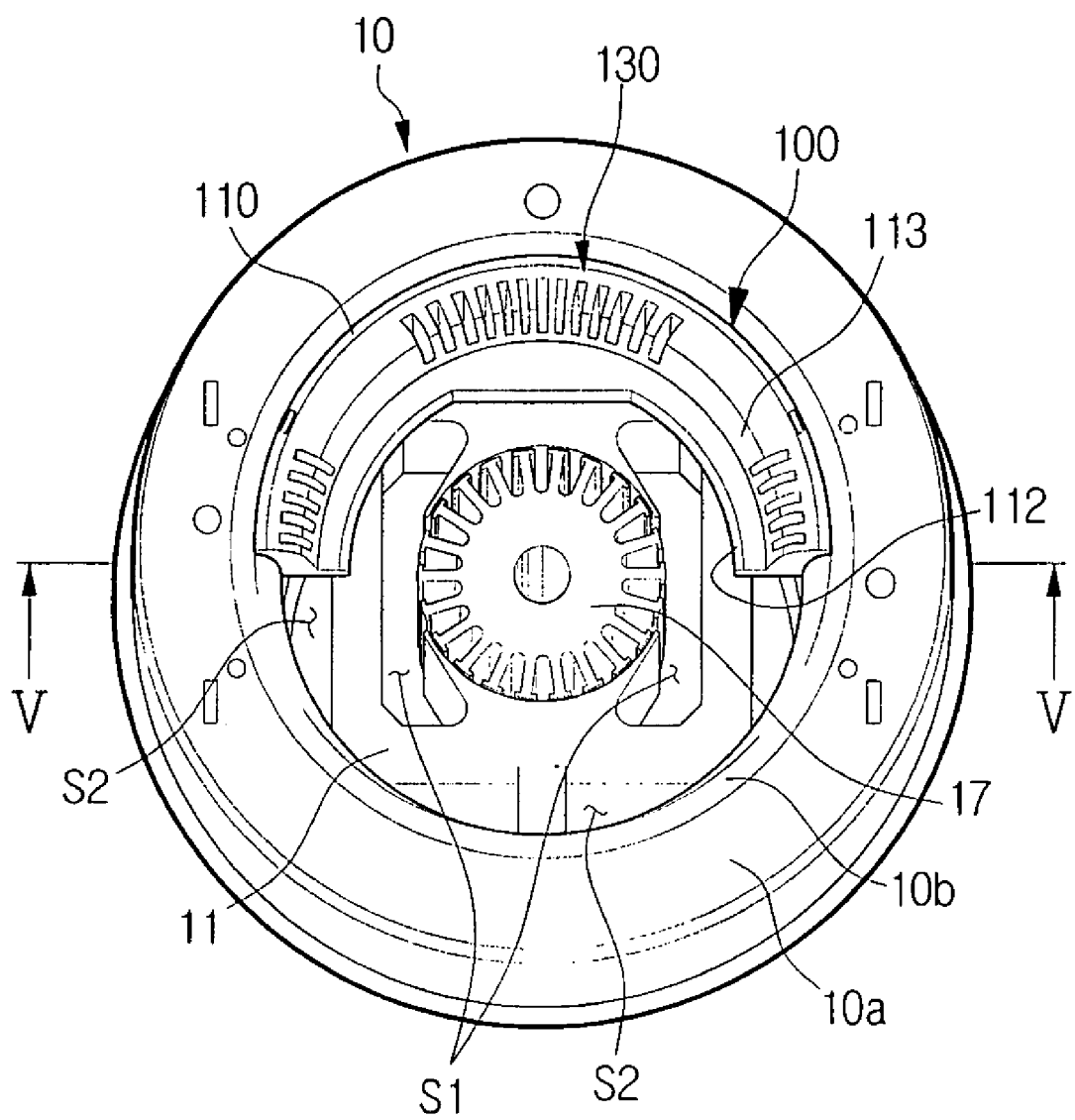
FIG. 4 is a partially cut-away top plan view exemplifying the motor-noise absorbing apparatus according to the first exemplary embodiment of the present disclosure illustrated in FIG. 2 when it is installed in the motor housing.
Figure 5:
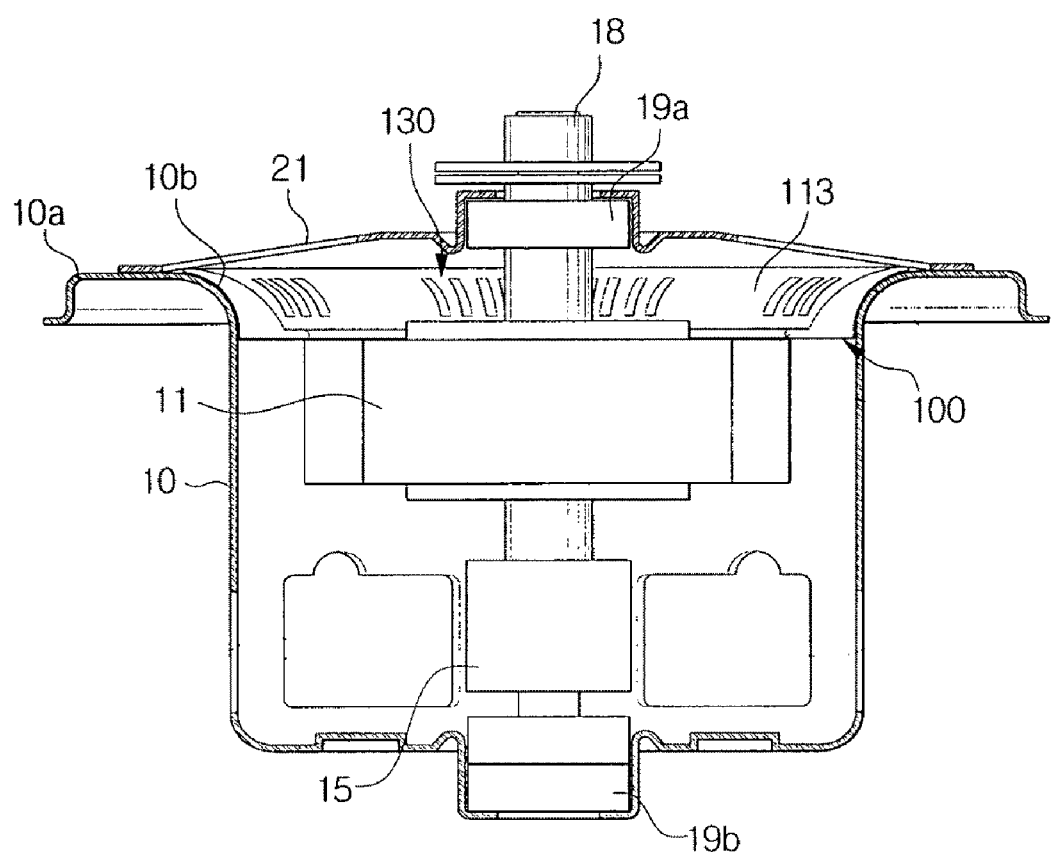
FIG. 5 is a cross-sectional view taken along line V-V in FIG. 4.

FIG. 2 is a top plan view exemplifying the motor-noise absorbing apparatus according to the first exemplary embodiment of the present disclosure, FIG. 3 is a perspective view exemplifying the motor-noise absorbing apparatus of the first exemplary embodiment illustrated in FIG. 2 when it is installed in a motor housing, FIG. 4 is a partially cut-away top plan view exemplifying the motor-noise absorbing apparatus of the first exemplary embodiment illustrated in FIG. 2 when it is installed in the motor housing, and FIG. 5 is a cross-sectional view taken along line V-V in FIG. 4.

Since a motor of the vacuum cleaner on which the motor-noise absorbing apparatus 100 according to the first exemplary embodiment of the present disclosure is installed has the same construction as that of a general cleaner motor, detailed description thereof will be omitted for clarity and conciseness.

Referring to FIG. 2, the motor-noise absorbing apparatus 100 according to the first exemplary embodiment of the present disclosure includes a body 110, a first air discharging part 120 and a second air discharging part 130.

Figure 1:
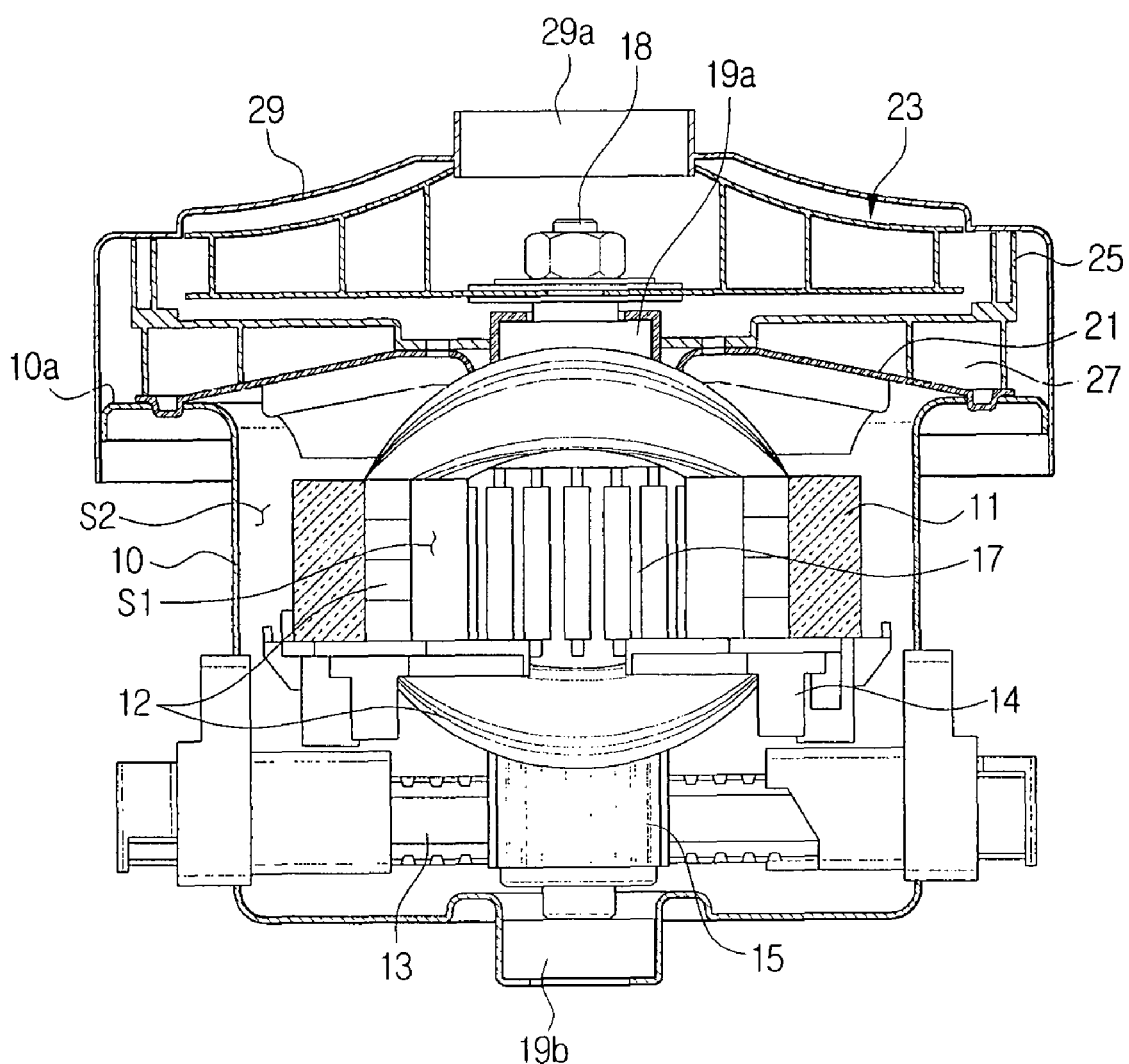
FIG. 1 is a cross-sectional view exemplifying a general motor assembly.

As illustrated in FIG. 2, the body 110 is formed in an approximate ring shape, and as illustrated in FIGS. 3 through 5, is seated and fixed on a peripheral part of an opening of a motor housing 10, that is, an inner circumference 10b (see FIG. 5) of a flange 10a, to cover a second space S2 between the motor housing 10 and the stator core 11 and thus to restrict an amount of air discharged into the second space S2. In this case, the body 110 is fixedly disposed, so that an outer circumference thereof is maintained compressed between the inner circumference 10b of the flange 10a and an undersurface of a housing cover 21. Also, the body 110 has a portion 113 configured, so that an upper surface thereof is increasingly rounded in an inward-and-down direction toward a center from a peripheral side. The portion 113 acts to smoothly discharge air from a guide vein 27 (see FIG. 1) into a first space 51 between the stator core 11 and a rotor 17.

The first air discharging part 120 is formed in the middle of the body 110, so that most of the air from the guide vein 27 is discharged into the first space S1. As illustrated in FIG. 3, the first air discharging part 120 is formed to have an area, which does not cover the stator core 11 and the first space S1.

The second air discharging part 130 is formed to penetrate a peripheral part of the body 110, so that a portion of the air from the guide vein 27 is discharged into the second space S2. As illustrated in FIG. 2, the second air discharging part 130 is made up of one more than, for example, four grill-shaped parts, which are formed at four positions of the body 110 approximately corresponding to the second space S2.

The motor, in which the motor-noise absorbing apparatus 100 according to the first exemplary embodiment of the present disclosure constructed as described above is mounted, guides most of discharge air, which flows from the guide vein 27 in a high speed, into the first space S1 through the first air discharging part 120, and discharges the rest of discharge air into the second space S2 through the second air discharging part 130. Accordingly, an amount of air discharged through the second air discharging part 130 can be restricted.

Referring to a graph of FIG. 9 comparing a noise level generated from the motor housing 10 of the motor in which the motor-noise absorbing apparatus of the first exemplary embodiment of the present disclosure is installed, with those in motors of comparison examples 1 and 2 in which it is not installed and partially installed, respectively, the motor of comparison example 1, that is, the motor in which the motor-noise absorbing apparatus of the first exemplary embodiment is not installed represented primary through thirdly blade passing frequency (BPF) peak noise levels of about 85 to about 95 dBA and a total overall noise level of 103.83 dBA.

The motor of comparison example 2, that is, the motor in which a motor-noise absorbing apparatus having the same construction as that of the motor-noise absorbing apparatus of the first exemplary embodiment except having no second air discharging part 130 is installed represented a total overall noise level of 101.76 dBA. Since the motor-noise absorbing apparatus of example 2 included no second air discharging part 130, the motor-noise absorbing apparatus sealed the space S2 between the motor housing 10 and the stator core 11 such that all air flows in the space S1 between the stator core 11 and the rotor 17.

To the contrary, the motor having the motor-noise absorbing apparatus 100 of the first exemplary embodiment represented a total overall noise level of 102.21 dBA. As apparent from the results as described above, it could be appreciated that the motor in which the motor-noise absorbing apparatus having no second air discharging part 130 represented a minimum total overall noise level.

On the other hand, as illustrated in the following table 1, when the comparison examples 1 and 2 and the first exemplary embodiment of the present disclosure are applied to motors having an input of 1800 W, respectively, suction forces thereof are as follows.

TABLE 1

|  | Comparison example 1 | Comparison example 2 | First embodiment | Second embodiment | Third embodiment | Fourth embodiment |
| --- | --- | --- | --- | --- | --- | --- |
| Maximum suction force | 658 | 510 | 632 | 628 | 618 | 635 |
| % to comparison example 1 | — | 77.5 | 96.0 | 95.4 | 93.9 | 96.5 |

The comparison example 2 represented as having a suction force of 77.5% to the comparison example 1, whereas the first exemplary embodiment of the present disclosure represented as having a suction force of 96.0% to the comparison example 1. Accordingly, it could be appreciated that when the noise and the suction force of the motor are considered together, the motor in which the motor-noise absorbing apparatus having the second air discharging part 130 is installed has more superior performance than the motor in which the motor-noise absorbing apparatus having no second air discharging part 130 is installed (i.e., comparison example 2).

Motor-noise absorbing apparatuses 200, 300 and 400 of a vacuum cleaner according to second through fourth exemplary embodiments of the present disclosure illustrated in FIGS. 6 through 8 are formed in ring shapes, respectively, and include bodies 210, 310 and 410, first air discharging parts 220, 320 and 420, and second air discharging parts 230, 330 and 430, respectively.

The motor-noise absorbing apparatuses 200, 300 and 400 of the second through fourth exemplary embodiments are configured, so that the bodies 210, 310 and 410 and the first air discharging parts 220, 320 and 420 have shapes equal to one another, respectively, but the second air discharging parts 230, 330 and 430 have shapes different from one another. That is, the second air discharging part 230 of the motor-noise absorbing apparatus 200 is formed of one more than, for example, four porous parts, each of which include a plurality of small holes is formed therein. The second air discharging part 330 of the motor-noise absorbing apparatus 300 is formed of two elongated holes having certain areas, which are disposed at positions symmetrical to each other about the first air discharging part 320, respectively. The second air discharging part 430 of the motor-noise absorbing apparatus 400 is formed of four elongated holes, which are disposed at positions symmetrical to each other about the first air discharging part 420, respectively.

Referring again to the graph in FIG. 9, total overall noise levels of motors in which the motor-noise absorbing apparatuses 200, 300 and 400 of the second through fourth exemplary embodiments constructed as described above are installed represented 101.30 dBA, 103.86 dBA and 102.87 dBA, respectively. Also, as illustrated in the table 1, suctions forces of the motors as described above represented 95.4%, 93.9% and 96.5% to the motor of comparison example 1.

Thus, most of the motors in which the motor-noise absorbing apparatuses 100, 200, 300 and 400 of the first through fourth exemplary embodiments maintained noise levels smaller than 103.83 dBA of the motor of the comparison example 1, while maintaining superior suction force of above approximately 95% to the comparison example 1.

As apparent from the foregoing description, according to the exemplary embodiments of the present disclosure, the motor-noise absorbing apparatus induces to forcibly discharge most of the discharge air flowed into the motor housing through the first space between the stator core and the rotor. Accordingly, the motor-noise absorbing apparatus according to the exemplary embodiments of the present disclosure can reduce an amount of the air discharged between the motor housing and the stator core, thereby reducing noise generating when the air collides with complicated structures disposed between the motor housing and the stator core, and thus generally reducing noise generating in the motor housing.

The foregoing embodiments and advantages are merely exemplary and are not to be construed as limiting the present disclosure. The description of the present disclosure is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A motor-noise absorbing apparatus for absorbing noise generated in a motor housing when air taken in through a top of a motor cover from a guide vein integrally formed with the motor cover below a bottom surface of an impeller via an impeller vein of the impeller, and then discharged to a plurality of windows of the motor housing between the motor housing and a stator core and between the stator core and a rotor, the apparatus comprising:

a body seated and fixed on a peripheral part of an opening of the motor housing to restrict an amount of air discharged between the motor housing and the stator core;

a first air discharging part formed in the middle of the body, so that most of the air is discharged between the stator core and the rotor; and at least one second air discharging part formed to penetrate a peripheral part of the body, so that a portion of the air is discharged between the motor housing and the stator core.

2. The apparatus as claimed in claim 1, wherein the second air discharging part is formed in an area smaller than that of the first air discharging part, so that the amount of the air discharged between the motor housing and the stator core is less than that of the air discharged between the stator core and the rotor.

3. The apparatus as claimed in claim 2, wherein the second air discharging part comprises at least one grill-shaped part.

4. The apparatus as claimed in claim 2, wherein the second air discharging part comprises at least one porous part in which a plurality of small holes is formed.

5. The apparatus as claimed in claim 2, wherein the second air discharging part comprises at least two elongated holes disposed symmetrical to each other about the first air discharging part.

6. The apparatus as claimed in claim 2, wherein the second air discharging part comprises at least four elongated holes disposed symmetrical to one another about the first air discharging part.

7. The apparatus as claimed in claim 1, wherein the body is configured, so that an upper surface thereof is increasingly rounded in an inward-and-down direction toward a center from a peripheral side, thereby smoothly discharging most of the air between the stator core and the rotor.

8. A vacuum cleaner motor comprising:
a motor housing having a flange;
a stator core disposed in the motor housing;
a rotor disposed in the stator core so that a first space is defined between the stator core and the rotor, the stator core disposed in the motor housing so that a second space is defined between the motor housing and the stator core;
a motor housing cover; and
a motor-noise absorbing apparatus disposed between the flange and the motor housing cover, the motor-noise absorbing apparatus comprising a first air discharging part and at least one second air discharging part, the first and second air discharging parts configured so that an amount of air discharged through the second space is less than an amount of air discharged through the first space.

9. The motor as claimed in claim 8, wherein the second air discharging part is formed in an area smaller than that of the first air discharging part.

10. The motor as claimed in claim 8, wherein the second air discharging part comprises at least one grill-shaped part.

11. The motor as claimed in claim 8, wherein the second air discharging part comprises at least one porous part in which a plurality of small holes is formed.

12. The motor as claimed in claim 8, wherein the second air discharging part comprises at least two elongated holes disposed symmetrical to each other about the first air discharging part.

13. The motor as claimed in claim 8, wherein the second air discharging part comprises at least four elongated holes disposed symmetrical to one another about the first air discharging part.

* * * * *